United States Patent
Savich

(10) Patent No.: US 7,430,230 B2
(45) Date of Patent: Sep. 30, 2008

(54) TUBE SOLID-STATE LASER

(75) Inventor: Michael S. Savich, Moorpark, CA (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 11/101,198

(22) Filed: Apr. 7, 2005

(65) Prior Publication Data

US 2006/0227841 A1 Oct. 12, 2006

(51) Int. Cl.
*H01S 3/06* (2006.01)
*H01S 3/07* (2006.01)
*H01S 3/16* (2006.01)
*H01S 3/04* (2006.01)
*H01S 3/093* (2006.01)

(52) U.S. Cl. .............. 372/66; 372/68; 372/72; 372/35

(58) Field of Classification Search ......... None
See application file for complete search history.

(56) References Cited

U.S. PATENT DOCUMENTS

| | | | | |
|---|---|---|---|---|
| 3,582,820 A | * | 6/1971 | Snitzer | 372/68 |
| 3,683,296 A | * | 8/1972 | Scalise | 372/75 |
| 4,514,850 A | | 4/1985 | Holmes et al. | |
| 4,516,244 A | | 5/1985 | Holmes | |
| 4,598,408 A | | 7/1986 | O'Keefe | |
| 4,744,090 A | * | 5/1988 | Freiberg | 372/94 |
| 4,751,716 A | | 6/1988 | Ream et al. | |
| 4,894,709 A | * | 1/1990 | Phillips et al. | 257/714 |
| 4,949,358 A | * | 8/1990 | Kantorski et al. | 372/94 |
| 5,099,311 A | * | 3/1992 | Bonde et al. | 165/80.4 |
| 5,105,430 A | * | 4/1992 | Mundinger et al. | 372/35 |
| 5,162,940 A | * | 11/1992 | Brandelik | 359/333 |
| 5,172,388 A | * | 12/1992 | Long et al. | 372/70 |
| 5,351,251 A | | 9/1994 | Hodgson | |
| 5,381,437 A | * | 1/1995 | Kuwabara et al. | 372/98 |
| 5,548,605 A | * | 8/1996 | Benett et al. | 372/36 |
| 5,636,239 A | * | 6/1997 | Bruesselbach et al. | 372/70 |
| 5,852,622 A | * | 12/1998 | Meissner et al. | 372/39 |
| 6,330,259 B1 | * | 12/2001 | Dahm | 372/35 |
| 6,339,605 B1 | | 1/2002 | Vetrovec | |
| 6,937,636 B1 | * | 8/2005 | Beach et al. | 372/66 |
| 2002/0081250 A1 | * | 6/2002 | Lord | 422/198 |
| 2002/0097769 A1 | | 7/2002 | Vetrovec | |

(Continued)

OTHER PUBLICATIONS

Vetrovec J., "Active mirror amplifier for high-average power", Proceedings of SPIE, The International Society for Optical Engineering, vol. 4270 (2001), pp. 45-55.

*Primary Examiner*—Minsun Harvey
*Assistant Examiner*—Sean Hagan
(74) *Attorney, Agent, or Firm*—MacPherson Kwok Chen & Heid, LLP.; David S. Park

(57) ABSTRACT

An improved tube solid-state laser (SSL) is provided utilizing diode pumping, microchannel cooling, optics, and/or new coating and bonding processes. In one example, an amplifier module for the SSL includes a tube of laser gain material, a first substrate and a second substrate including microchannels adjacent an interior and exterior surface of the tube, respectively, and a plurality of diode bars arranged exterior to the second substrate. Advantageously, thermal lensing effects, birefringence, bifocussing, and alignment problems associated with typical tube SSLs are eliminated or reduced while providing high beam quality and high average power levels.

14 Claims, 10 Drawing Sheets

U.S. PATENT DOCUMENTS

2002/0110164 A1   8/2002   Vetrovec
2002/0172253 A1   11/2002  Vetrovec
2003/0063884 A1* 4/2003   Smith et al. .................. 385/129

* cited by examiner

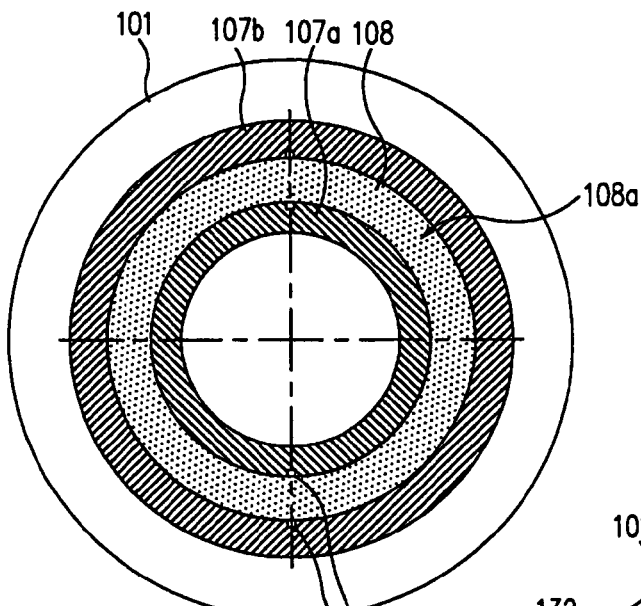
FIG. 2B1a
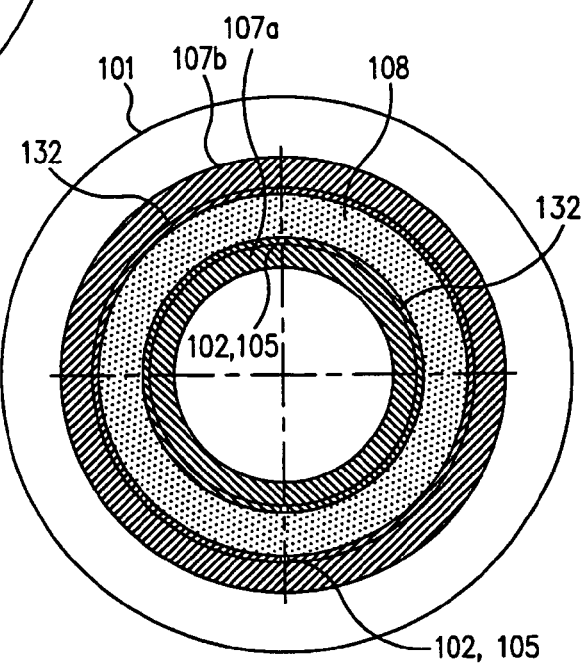
FIG. 2B1b
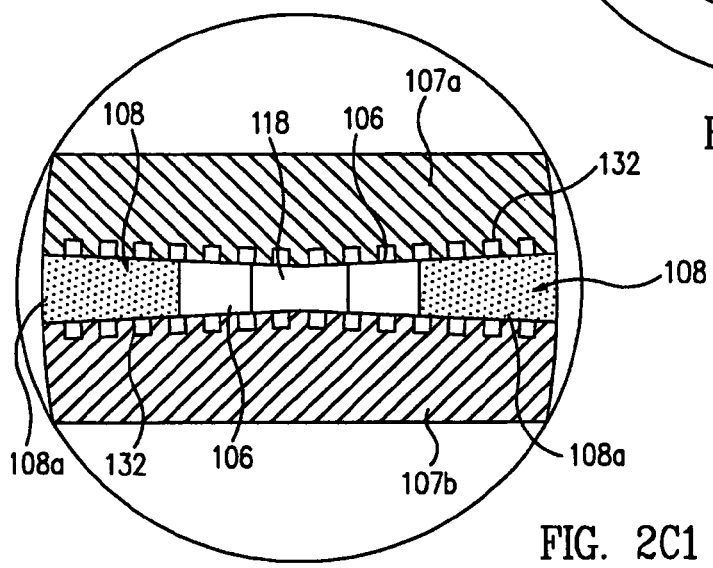
FIG. 2C1

TUBE SOLID-STATE LASER

TECHNICAL FIELD

The present invention relates generally to lasers and, more particularly, to tube solid-state lasers with improved beam quality and power output.

BACKGROUND

A modern solid-state laser (SSL) exhibits a high wall-plug efficiency, can operate at high-average power (HAP) levels, and can attain a high beam quality (BQ). Such lasers are highly versatile and are being developed for a variety of applications including air defense and precision strikes, cutting, welding, and drilling in the automotive, aerospace, shipbuilding, and oil and gas industries, and direct material processing such as heat treatment, cutting, and welding.

The lasing medium for SSLs are the atoms of a dopant in a transparent crystalline or amorphous (glass) host material. Physically, the host material can be in various shapes but five principal configurations of an SSL are of interest: a rod, a slab, a disk, a fiber, and a tube.

Average power generated by an SSL is limited principally by thermo-optic distortion (also known as thermal lensing) and thermal stress fracture considerations. Rod lasers are practically limited in these areas, and in practice, rod lasers have been limited in output to about 1 kW of average power. Slab lasers overcome some of the limitations of rod lasers but have poor aperture fill factor (elliptical beam extraction from rectangular aperture). In practice, slab lasers with good beam quality have been limited in output to between about 15 kW and about 20 kW of average power. Disk lasers are functionally very promising as they have very low distortion, but many challenges must be overcome before disk lasers can be scaled to HAP. With regard to a fiber, output of a single fiber is limited to about 1 kW, and hence the output of many fibers must be combined to generate a HAP beam. However, beam-combining technology lags in development. In a tube laser, the SSL gain medium is in the shape of a tube and the laser amplifies an annular beam.

Temperature profiles lead to stress in the laser material. Analyses for uniform heat source density and equal heating power per unit length show that height of the temperature profile in the slab is only 36% of that in the rod, and in the tube it is only 10% of that in the rod. In rod and tube lasers the thermal stress has circular symmetry with the principal stress components being in the azimuthal, radial, and longitudinal directions. The maximum stress at the surface of the rod does not depend on rod diameter. Therefore, the only way of power scaling rod lasers is to use a longer rod or several rods. The surface stress at the slab and tube is proportional to the aspect ratio "b/a", where "a" is a thickness of the slab or tube, and "b" is the perimeter of the tube or length of cross-section of the slab. Output power is proportional to the lasing medium volume and limited by thermal fracture dependent upon surface stress of the rod, slab, or tube. For tube lasers, output power can be about 10-20 times higher than for rod lasers of equal length. The advantage of the tube geometry is that a much larger aspect ratio b/a can be realized with tubes than with slabs. Therefore, tube SSLs combine many of the attractive properties of the rod, slab, and disk lasers, and overcome many of the aforementioned disadvantages.

However, previous tube SSLs have used flash lamps for excitation, unsophisticated resonator optics, and/or primitive coatings, leading to thermal lensing effects, and birefringence, bifocussing, and alignment problems associated with the tube SSL. Thus, an improved tube SSL that reduces or eliminates thermal lensing effects, and birefringence, bifocussing, and alignment problems is highly desirable.

SUMMARY

The present invention provides an improved tube solid-state laser (SSL) utilizing diode pumping, microchannel cooling, axicon/waxicon/reflaxicon optics, and/or new coating and bonding processes. Advantageously, the present invention reduces thermal lensing effects and reduces or eliminates birefringence, bifocussing, and alignment problems associated with typical tube SSLs while providing high beam quality and high average power levels.

In accordance with an embodiment of the present invention, an amplifier module for a solid-state laser is provided, the amplifier module including a tube having an interior surface and an exterior surface, the tube including a laser gain material; a first substrate adjacent the interior surface of the tube, the first substrate including a first plurality of microchannels; a second substrate adjacent the exterior surface of the tube, the second substrate including a second plurality of microchannels; and a plurality of diode bars arranged exterior to the second substrate and configured to provide optical pump radiation to the laser gain material.

In accordance with another embodiment of the present invention, a tube solid-state laser is provided, the laser including an amplifier module configured to provide an optical gain for a source light, the amplifier module including elements as described above.

In accordance with yet another embodiment of the present invention, a method for lasing is provided, the method including providing an amplifier module including: a tube having an interior surface and an exterior surface, the tube including a laser gain material; a first substrate adjacent the interior surface of the tube, the first substrate including a first plurality of microchannels; a second substrate adjacent the exterior surface of the tube, the second substrate including a second plurality of microchannels; and a plurality of diode bars arranged exterior to the second substrate. The method further includes providing pump radiation from the plurality of diode bars to the laser gain material of the amplifier module, and flowing a coolant through the first and second plurality of microchannels.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2B1a shows a cross-sectional view of the laser amplifier module in FIG. 2A in accordance with another embodiment of the present invention.

FIG. 2B1b shows yet another cross-sectional view of the laser amplifier module in FIG. 2A in accordance with another embodiment of the present invention.

FIG. 2C1 shows an enlarged view of a section of the laser tube in accordance with another embodiment of the present invention.

Figure 1:
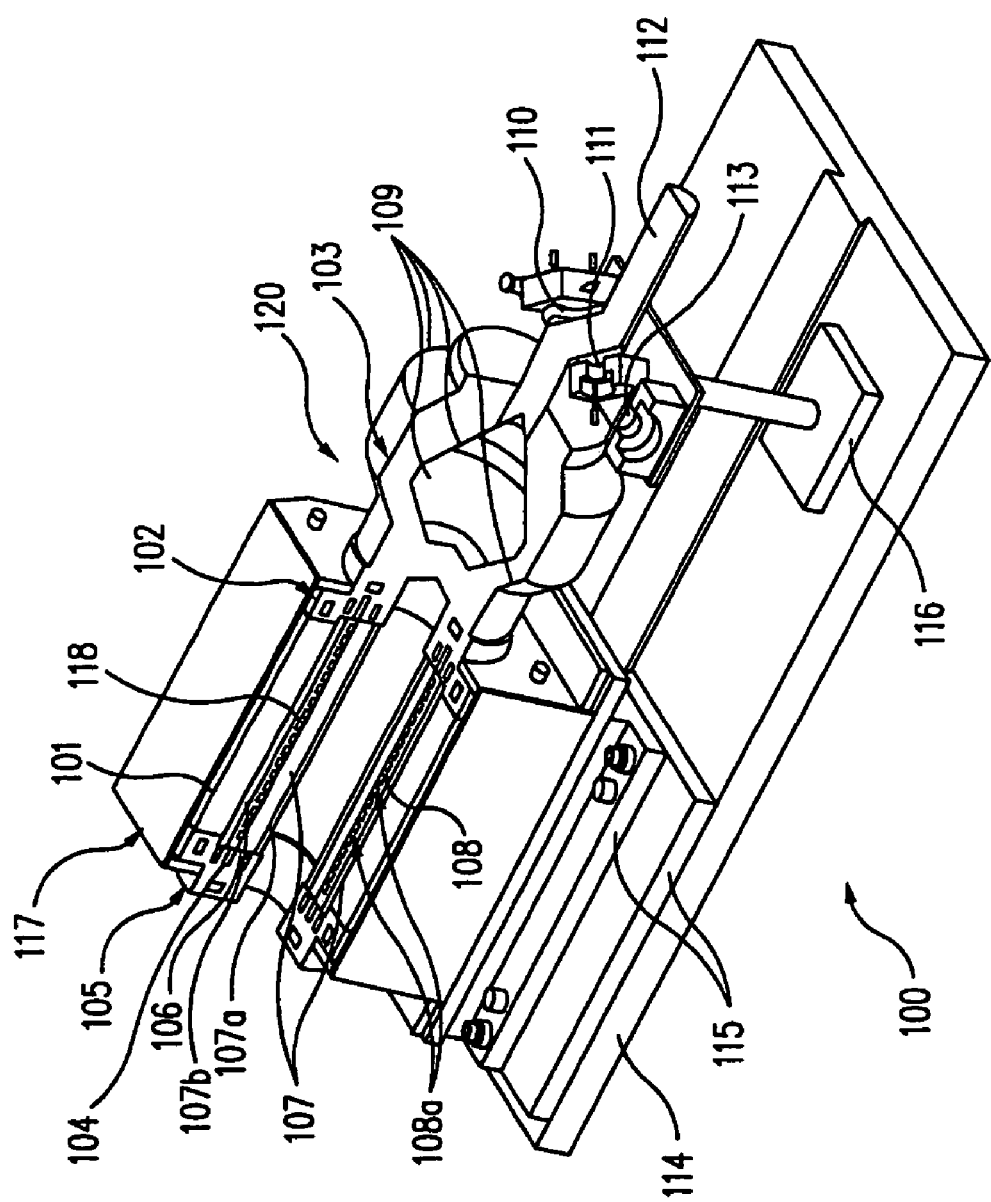
FIG. 1 shows a laser amplifier module assembly in accordance with an embodiment of the present invention.

Embodiments of the present invention and their advantages are best understood by referring to the detailed description that follows. It should be appreciated that like reference numerals are used to identify like elements illustrated in one or more of the figures. It should also be appreciated that the figures are not necessarily drawn to scale.

DETAILED DESCRIPTION

The present invention provides an improved tube solid-state laser (SSL) utilizing diode pumping, microchannel cooling, axicon/waxicon/reflaxicon optics, and/or new coating and bonding processes to provide improved beam quality and power output. The present invention combines the advantages of beam quality, which is inherent in the unstable linear resonator, with the advantages of efficient use of area (and thus high power) and of symmetry inherent in the annular (tube) configuration. In one embodiment, the present invention also includes an optical element (e.g., axicon, waxicon, and/or reflaxicon optics) to convert the annular beam to a compacted cylindrical beam.

The following are definitions of terms as used in this document:

"Laser gain medium" refers to an optical material having a host lattice doped with suitable ions, which in the subject invention are pumped to a laser transition. Although this invention is not limited to a specific lasing material, or a specific pump source, the preferred host lattice materials are yttrium aluminum garnet (YAG), gadolinium gallium garnet (GGG), gadolinium scandium gallium garnet (GSGG), lithium yttrium fluoride (YLF), yttrium vanadate, phosphate laser glass, silicate laser glass, and sapphire. Suitable dopants for these lasing media include but are not limited to Ti, Cu, Co, Ni, Cr, Ce, Pr, Nd, Sm, Eu, Yb, Ho, Dy, and Tm. The laser gain medium may also be of composite construction comprising doped and undoped sections, or sections doped with different ions.

"Laser diode" refers to a source of optical radiation comprising a semiconductor laser diode. The diode may be mounted on a substrate and placed on a heat exchanger. The diode may be suitable for pumping laser gain medium to a laser transition.

"Diode array" refers to an ensemble comprising one or more laser diodes. The diodes may be mechanically and/or electrically connected, equipped with electric terminals, and placed on a liquid-cooled heat exchanger.

"Microchannel" refers to devices engineered at the micro scale to achieve high contact area per unit system volume (e.g., thin-film contacting), establishing uniform flow distribution with substantially higher throughput per total system volume and much higher heat and mass transfer rates than are found in conventional macro-scale technologies.

"Undoped endcap" refers to an undoped portion of the laser tube, and may be the same as undoped lasing material that is attached to the end of a doped portion of the laser tube.

"Axicon (Waxicon, Reflaxicon)" refers to an optical element, which has two concentric conical mirrors to convert an annular beam to a compacted cylindrical beam.

"Double Reflaxicon" refers to an optical element, which has four concentric conical mirrors to convert the annular beam to a compacted cylindrical beam while eliminating polarization problems.

The present invention provides for several advantages, including but not limited to the following:

1. Reducing or minimizing the thermal gradient between the interior and outer surfaces of the laser tube by using toric optically transparent interior and outer substrates which bond (e.g., by diffusion or anoding) or are sealed by O-rings to the laser tube. Each optically transparent substrate contains a built-in heat exchanger with microchannels such that both the interior and outer surfaces of the laser tube are cooled so that coolant can directly wet outer and interior surfaces of the gain media of the laser tube. By independently controlling the flow rate and temperature of the coolant for both the interior and outer heat exchangers, the thermal gradient between tube surfaces can be minimized. This novel approach provides very high heat transfer and effectively minimizes thermal deformation and stress of the laser tube.

2. Reducing or minimizing the bend of the laser tube axis, thereby decreasing the effect of thermal lens by making the outer and interior cooling substrates very rigid with material optically transparent at pump diode wavelength.

3. Realizing high transport efficiency and pump uniformity of pump radiation by placing stacks of pump diode bars around the outer heat exchanger close to the lasing tube with the interior surface coating being antireflective or reflective at pump wavelength. Improvement in radiation uniformity may be achieved by rotating the tube relative to the stack of pump diode bars or by rotating the stack of pump diode bars relative to the tube or outer substrate. Pump diode radiation is injected into the lasing tube through the optically transparent outer substrate and microchannels acting as a heat exchanger. Host material of the tube is doped with lasant ions so pump power is absorbed in two passes or more.

4. Reducing risk of fracture, reducing the lensing effect of the tube end surfaces, decreasing path length of swirling amplified spontaneous emission (ASE) rays, if they exist, and isolating the optical coating on the end of the laser tube from the thermally loaded portion of the tube by using undoped toric endcaps which may be attached to doped portions of the laser tube through a diffusion bonding process. Thus, those surfaces that were in tensile strain without an endcap are now held in compressive strain, reducing the risk of fracture and reducing or minimizing parabolic curvature at the end surfaces of the laser tube.

5. Mitigating oscillation of the radial mode and negative effect of trapped ASE and parasitic mode (if ASE exists)

that decrease extraction of laser energy and increase absorption of pump radiation. The interior surface of the laser tube may include a taper and a polish or reflective or antireflective coating at laser wavelength and pump wavelength. This novel approach provides for changing the reflective angle of radial mode rays by using a reflective coating at laser wavelength or polish coating on the outer tube surface, and utilizing the effect of total internal reflection (TIR) to regenerate part of the radial mode lasing energy to axial mode lasing energy. The present invention can also decrease the trapped ray paths of ASE by changing the reflection angle of swirling rays (if ASE exists) while increasing pump power absorption by changing the reflection angle of pump radiation rays, thus significantly increasing the number of passes of pump radiation rays. The transparent outer substrate is not limited to a cylindrical shape but may also be shaped as a polygon having an odd number of sides, thereby minimizing ASE after reflecting on the polygon surfaces.

6. Reducing or eliminating birefringence and bifocussing by using two identically loaded tube laser gain elements separated by a 90 degree toric quartz rotator. Both surfaces of the rotator are attached to toric endcap surfaces of the laser tube through optical contact or diffusion or anodic bonding processes, similar to those processes used for attachment of the outer and interior cooling substrates to the laser tube. Thus the outer and interior cooling substrates can be used to cool the quartz rotator also. This novel approach provides for tight contact between the rotator and toric tube surfaces and eliminates negative lens and alignment problems, thereby providing good beam quality.

7. Reducing or eliminating polarization and very sophisticated alignment problems (of the tube laser resonator) between two reflaxicons and the laser tube, the two reflaxicons being included in an optically transparent toric hollow prism with 4 conical surfaces which have a reflective coating at laser wavelength. The hollow prism can be made from the same or different material that is used for the tube laser and may be attached to the toric end of the laser tube through a diffusion bonding process.

8. Combining, through a bonding process, two laser tubes, a quartz rotator, two reflaxicons, toric endcaps, and outer and interior cooling substrates with distribution cooling manifolds, into one monolithic compact laser unit.

9. Reducing or minimizing technical problems of scaling a tube SSL (using SSL as master oscillator) to HAP.

10. Reducing or minimizing technical problems of scaling SSL to HAP and ultra high power by using tube SSL monolithic unit as an amplifier.

Figure 2A:
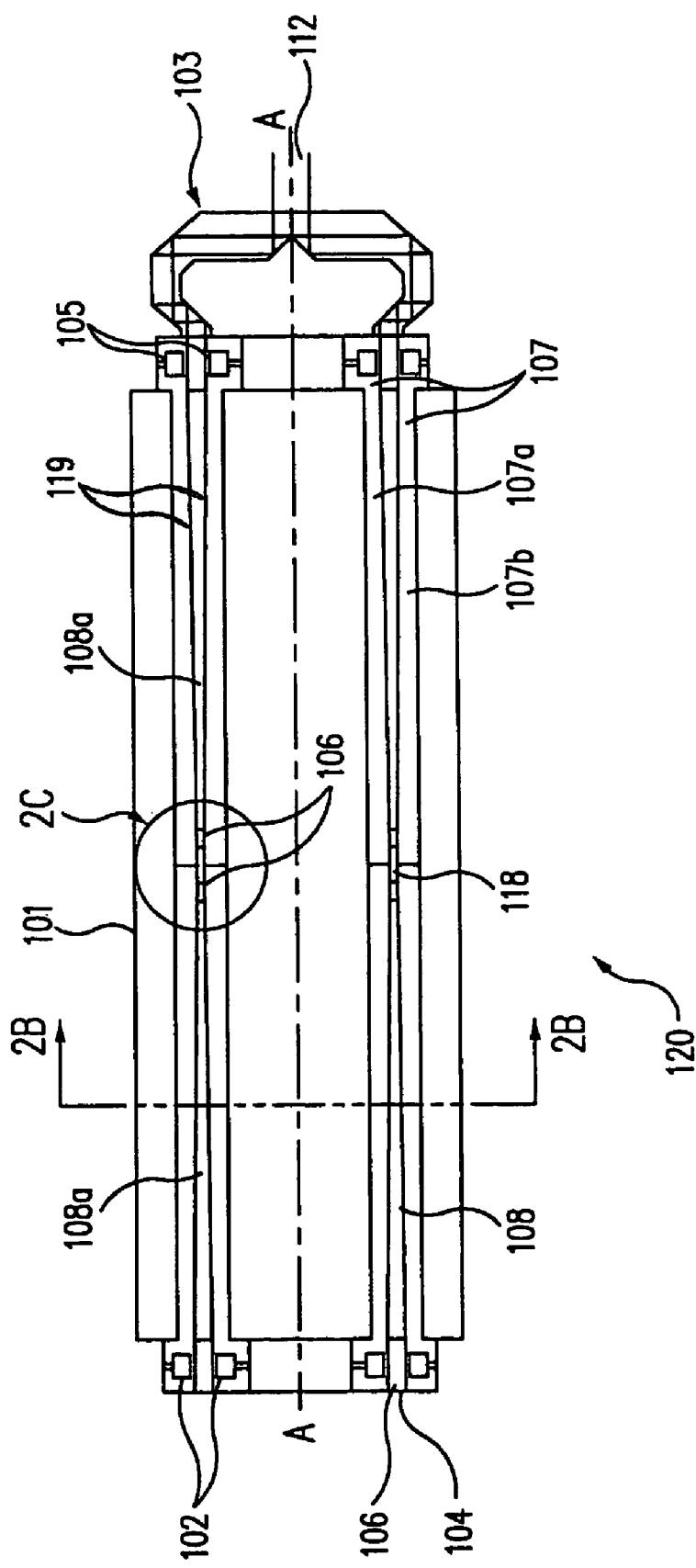
FIG. 2A shows a cross-sectional view of the laser amplifier module illustrated in FIG. 1 in accordance with an embodiment of the present invention.
Figure 2B:
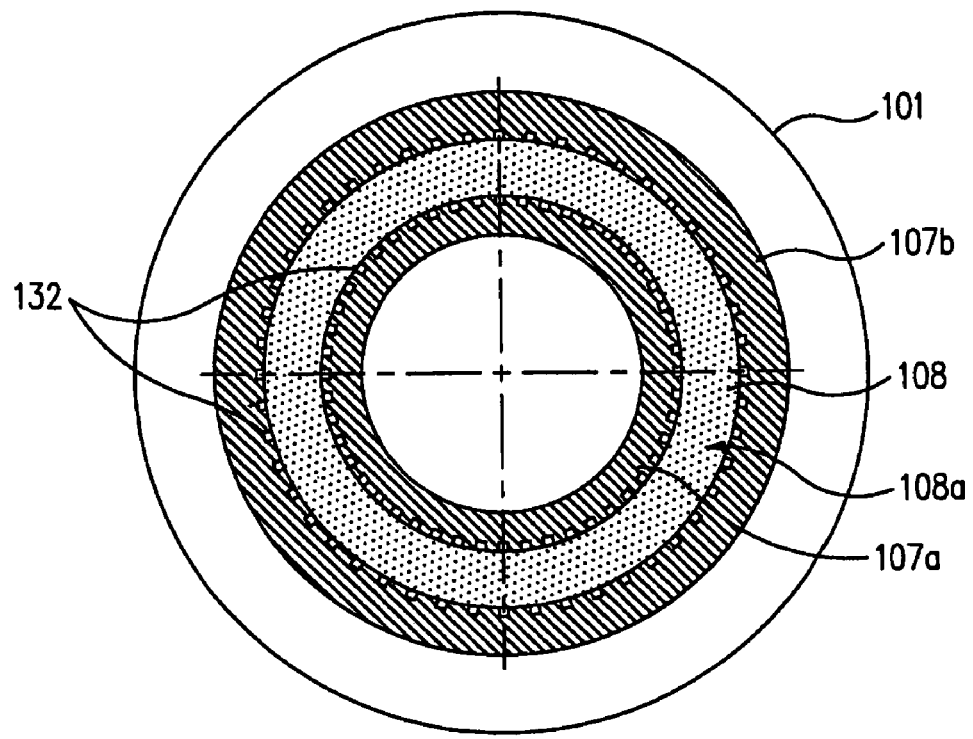
FIG. 2B shows a cross-sectional view of the laser amplifier module taken along the line 2B-2B shown in FIG. 2A in accordance with an embodiment of the present invention.
Figure 2C:
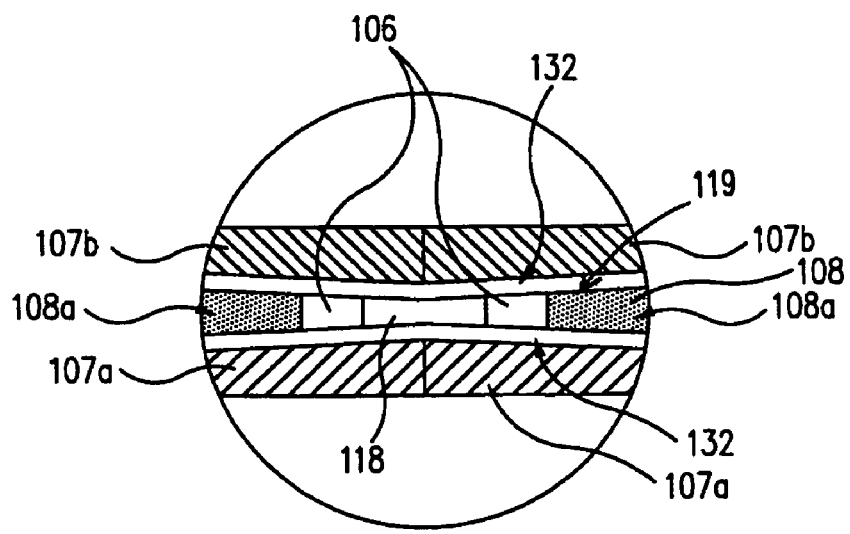
FIG. 2C shows an enlarged view of a section of the laser tube in accordance with an embodiment of the present invention.
Figure 3:
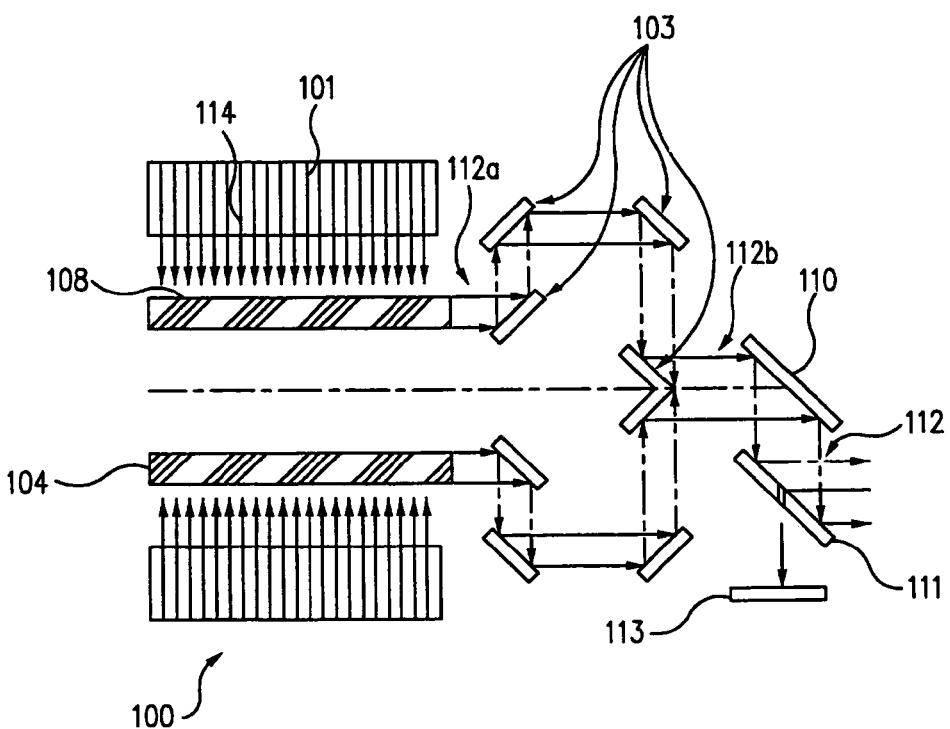
FIG. 3 shows an optical layout for the laser amplifier module assembly illustrated in FIG. 1 in accordance with an embodiment of the present invention.

Referring now to FIGS. 1, 2A, 2B, 2C, and 3, a laser amplifier system 100 is shown including a laser amplifier module 120. FIG. 2A shows a cross-sectional view of module 120 combined through prealignment and bonding processes, FIG. 2B shows a cross-sectional view of the laser amplifier module taken along the line 2B-2B shown in FIG. 2A, and FIG. 2C shows an enlarged view of a section of the laser tube in accordance with an embodiment of the present invention. FIG. 3 shows an optical layout for the laser amplifier system 100 in accordance with an embodiment of the present invention.

Laser amplifier system 100 includes a laser amplifier module 120 comprising diode arrays 101, a tube 108 including laser gain elements 108a separated by an optically transparent 90 degree quartz rotator 118 (see also FIG. 2C), undoped tube endcaps 106, a high reflecting (HR) flat mirror 104, interior and exterior substrates 107a and 107b (each including a plurality of microchannels 132 (FIG. 2C)), and a prism 103, in one example including a double reflaxicon comprised of an optically transparent substrate with HR coating mirror surfaces 109. System 100 further includes a flat mirror 110, an output coupler (OC) flat mirror or scraper mirror with a centered hole 111, and an HR feedback mirror 113. System 100 further includes an optical post 116, adjustment plates 115, an optical bench 114, and a housing 117.

Interior substrate 107a is adjacent an interior surface of laser tube 108 and forms an interior concentric tube. Exterior substrate 107b is adjacent an exterior surface of laser tube 108 and forms an exterior concentric tube. Thus, substrates 107a and 107b "sandwich" laser tube 108 to form a set of concentric tubes (see FIG. 2B). A first manifold 102 and a second manifold 105 are used for supplying and discharging/recirculating, respectively, a coolant through the heat exchanger and microchannels of substrates 107a and 107b, and in one embodiment, the manifolds are a part of housing 117. Suitable coolants may include but are not limited to liquids such as deionzied water, alcohol, members from the Freon family, and liquid nitrogen.

Referring now in particular to FIGS. 2A, 2B, and 2C, substrates 107a and 107b are made of a material optically transparent to the pump radiation. In one example, fused silica may be used but other optical materials transparent to the pump radiation and suitable for microchannel fabrication may also be used. As the substrates and coolant are optically transparent at the pump radiation wavelengths, the pump radiation from diode arrays 101 is transported through the substrates and coolant to laser gain elements 108a.

In one embodiment, microchannels 132 are provided integral to both interior substrate 107a and exterior substrate 107b and the plurality of microchannels are provided substantially parallel to a lengthwise axis A of the tube (FIG. 2A) or substantially parallel to a lengthwise contour of the outer surface of laser tube 108 (see microchannels 132 of FIG. 2C). The presence of two independent sets of microchannels 132 (one set integral to substrate 107a and a second set integral to substrate 107b) permit reduction or minimization of a thermal gradient between tube 108 surfaces by changing the flow rate and/or temperature of the coolant being applied through the microchannels. Examples of applicable microchannels and other relevant elements are described in commonly-assigned U.S. Pat. No. 6,339,605, and published applications US2002/0097769 (00-173), US2002/0110164 (00-213 & 253), and US2002/0172253 (00-245), which are incorporated by reference herein for all purposes.

In general, the lensing contribution from thermal stress is different for light polarized parallel to the principal axes of the stress tensor as compared to light polarized perpendicular to the principal axes of the stress tensor. Stress-induced birefringence and bifocussing significantly reduce power and beam quality of the laser beam. To eliminate birefringence and bifocussing, laser tube 108 is comprised of two identically loaded laser gain elements 108a separated by transparent 90 degree quartz rotator 118 with undoped endcaps 106 on both ends of the laser elements. Through diffusion bonding and prealignment processes, quartz rotator 118 is attached on both ends and surfaces to endcaps 106 and toric surfaces of laser gain elements 108a.

Alternatively, quartz rotator 118 may be combined with tube laser elements using an optical contact between rotator surfaces and toric surfaces of endcaps when exterior and interior substrates acting as heat exchangers are attached to laser gain elements 108a through a diffusion bonding process. Before two laser gain elements 108a are assembled with quartz rotator 118, one laser gain element 108a must be coupled through diffusion bonding to two endcaps at each end, and the other laser gain element 108a must be coupled through diffusion bonding to one endcap at one end and to prism 103 at another end.

Undoped endcaps provide a number of benefits, including but not limited to insulating by optical coating the ends of the laser tube from a thermal load, and providing a heat conduction path away from the gain medium thereby reducing thermal stresses and associated distortions. Advantageously, the use of undoped endcaps with laser gain elements eliminates or reduces the risk of fracture, reduces or minimizes the lensing effect of the tube end surface, and changes tensile strain to compressive strain.

To mitigate oscillation of the radial mode and negative effects of trapped ASE and parasitic mode (if ASE exists), and to increase absorption of pump radiation, the interior and outer surfaces of tube laser gain elements 108a can have a taper 119 (see FIG. 2A, 2C) such that the diameter of the tube laser gain element increases from the center portion extending toward the outer end, similar to a funnel or conic shape. For the same reason interior surfaces of laser tube elements have a reflective coating at laser and pumping wavelength, outer surfaces of the tube laser elements can have a reflecting coating at the laser wavelength.

In one embodiment, prism 103 can be made from the same or different undoped material as that used for the tube laser gain elements and includes four conical surfaces 109 (see FIG. 1) with reflection coating at the laser wavelength. This design permits the combination of two identical reflaxicons and an endcap in one unit that converts the annular beam to a compact cylindrical beam. Using two reflaxicons of the same type eliminates polarization scrambling problems, while the tube end of prism 103 can fulfill the same function as that of endcap 106.

Referring now to FIGS. 2B1a, 2B1b, and 2C1, sections of the laser amplifier module are shown in accordance with another embodiment of the present invention. FIGS. 2B1a and 2B1b show cross-sections of the module similar to that shown in FIG. 2B except that a plurality of microchannels 132, which are provided integral to both interior substrate 107a and exterior substrate 107b, run substantially perpendicular to a lengthwise axis A of the laser tube (FIG. 2A). FIG. 2B1a shows a cross-section with manifolds 102, 105 but without microchannels 132. FIG. 2B1b shows a cross-section including microchannels 132. FIG. 2C1 shows an enlarged view of a section of the laser tube similar to that shown in FIG. 2C except that the plurality of microchannels 132 are configured to be substantially perpendicular to a lengthwise axis A of the laser tube.

Referring now in particular to FIG. 3, the stack of diode arrays 101 is placed around the exterior surface of optically transparent substrate 107b (FIGS. 1, 2A, 2B, and 2C), and in one embodiment can be optionally rotated relative to substrate 107b for improved uniformity in the distribution of pump radiation. The coolant system is designed to prevent overheating of diodes because semiconductor diode lasers are typically 30-50% efficient in converting electrical energy into optical radiation suitable for laser pumping. The stack of diode arrays 101 provide optical radiation 114 to laser gain elements 108a. Laser gain elements 108a may be doped with suitable laser ions that absorb significant portions of incident optical radiation 114 and are pumped to upper laser transition. Accordingly, the laser tube gain elements amplify the resonator laser beam 112a, 112b.

An annular beam 112a is incident on prism 103 and is converted by prism 103 to a cylindrical beam 112b. Beam 112b is reflected by flat mirror 110 and then OC mirror or a scraper mirror with a centered hole 111. Through this hole, the laser beam is incident on HR feedback mirror 113. The laser beam incident on mirror 111 is output as beam 112.

The return beam reflects from HR feed back mirror 113 and flat mirror 110 to prism 103 including a double reflaxicon. After the cylindrical beam is converted by prism 103 to an annular beam, the beam goes through laser gain elements 108 and reflects from HR flat mirror 104. HR flat mirror 104 of the resonator is accomplished by coating the flat toric surface of endcap 106.

Figure 4:
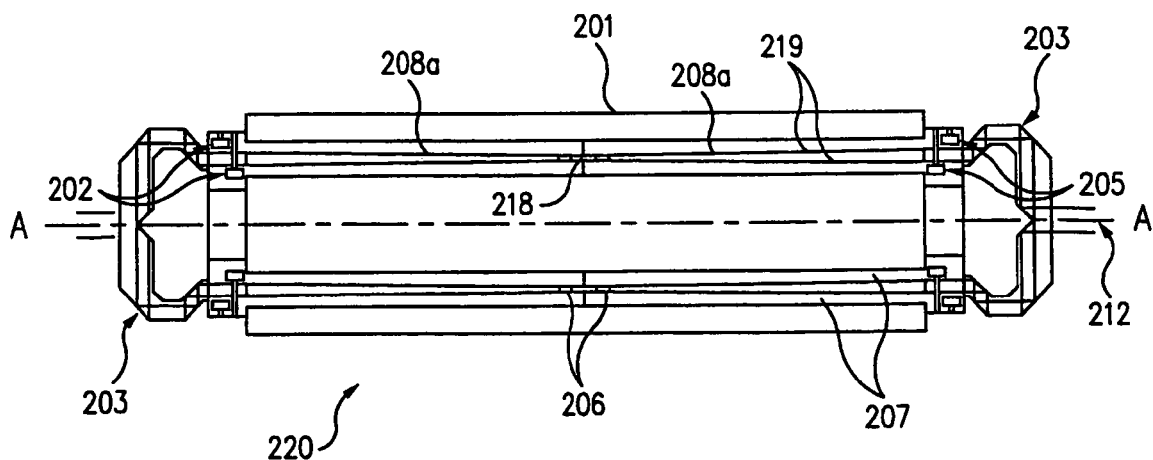
FIG. 4 shows a cross-sectional view of a laser amplifier module in accordance with another embodiment of the present invention.
Figure 5:
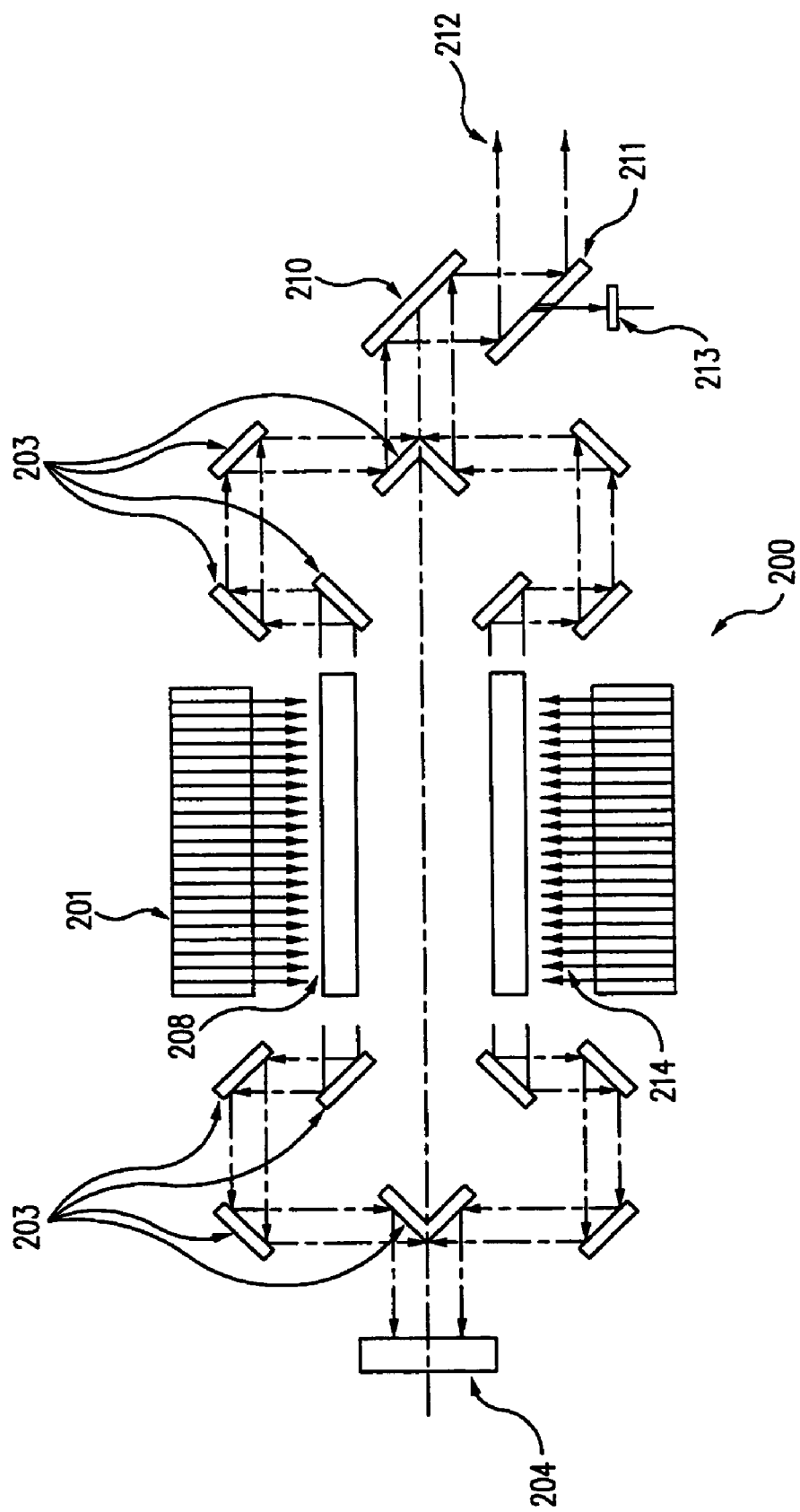
FIG. 5 shows an optical layout for the laser amplifier module illustrated in FIG. 4 in accordance with an embodiment of the present invention.

Referring now to FIGS. 4 and 5, a cross-sectional view of a laser amplifier module 220 of a system 200 and an optical layout therefor are shown in accordance with another embodiment of the present invention. Similar to amplifier module 120 described above with respect to FIGS. 1 through 3, amplifier module 220 is a monolithic compact laser unit combined through prealignment and bonding processes. In accordance with this embodiment, a HAP laser includes the monolithic unit comprising two tube laser gain elements 208a having a taper 219 and separated by toric quartz rotator 218 and endcaps 206. Module 220 further includes undoped endcaps 206 on both ends of the tube laser elements and a double reflaxicon in a prism 203 for outputting a beam 212. Optically transparent substrates 207 each include flow passages and a plurality of microchannels, as similarly described above with respect to FIGS. 1 through 3, to thereby act as heat exchangers. Module 220 further includes a stack of diode arrays 201. A disadvantage of these layouts is that output and input orifices for the coolant (manifolds 202 and 205) may penetrate undoped annular tube ends of prism 203 of modules 220, which may cause some (although not significant) laser beam distortion. In order to mitigate this problem, it is desirable that the coolant have a refraction index substantially similar to the refraction index of the laser tube material.

System 200 (see FIG. 5) further includes optics including a flat mirror 210, an OC mirror or scraper mirror with centered hole 211 reflecting a beam 212, an HR feedback mirror 213, and an HR flat minor 204. The return beam reflects from HR feed back minor 213 and flat mirror 210 to double reflaxicon 203. After the cylindrical beam is converted by double reflaxicon 203 to an annular beam, the beam goes through laser gain elements 208a of a laser tube 208 and double reflaxicon 203, which convert the annular beam to a cylindrical beam, and finally to HR mirror 204.

The difference between module 120 and module 220 is that instead of including HR coating surface of tube laser element 104 (FIGS. 1-3), the monolithic laser unit combines two double reflaxicons 203 and adds HR flat mirror 204. Advantageously, the design described in this embodiment allows for increased flexibility in cavity design, where the laser monolithic unit can be located at an arbitrary position within the laser cavity and between OC and HR mirrors.

Figure 6:
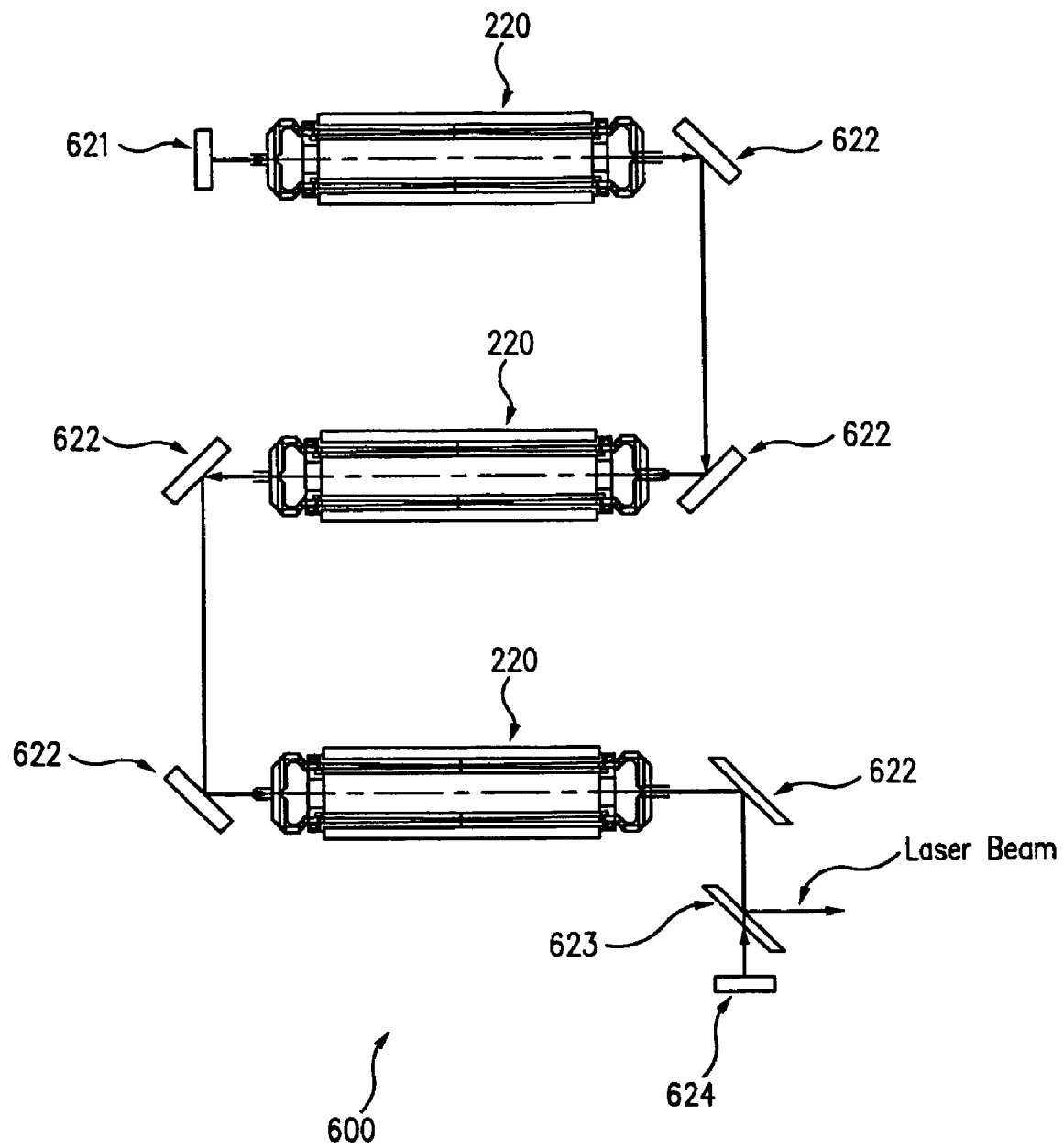
FIGS. 6 and 7 show the use of a plurality of laser amplifier modules.
Figure 7:
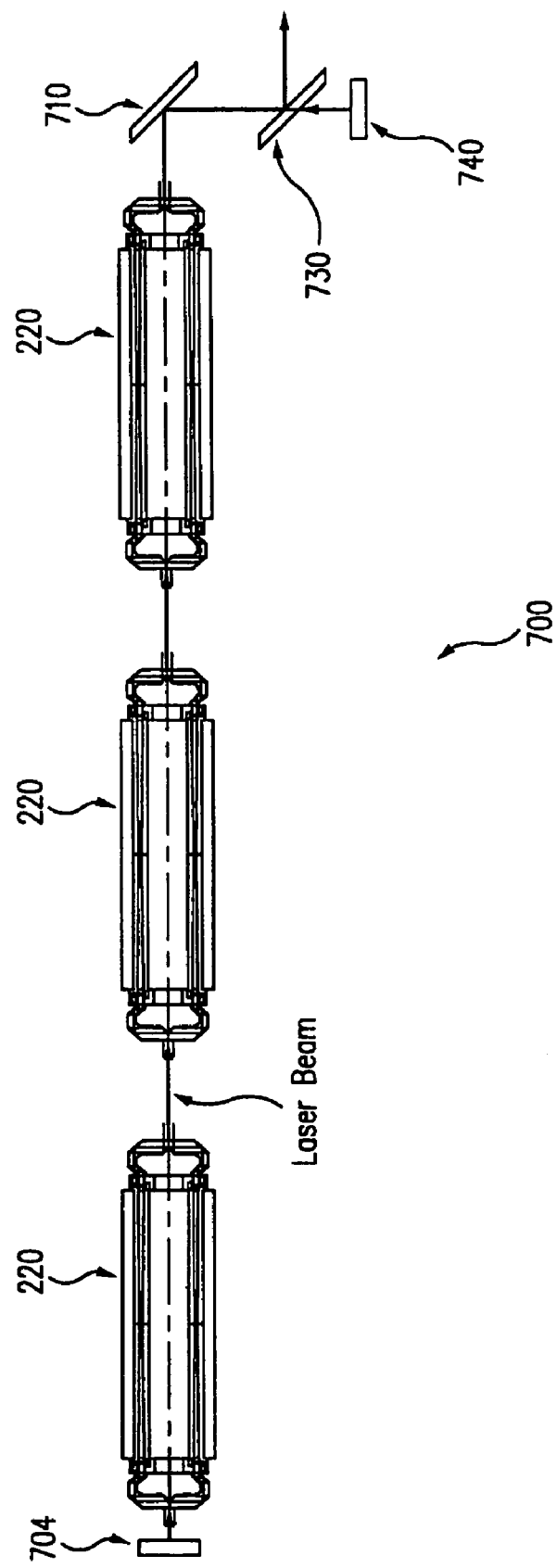

Also this concept allows tube laser module 220 to easily be used as an amplifier. Referring to FIGS. 6 and 7, optical layouts of systems 600 and 700 are shown utilizing a plurality of laser modules 220 with mirrors. System 600 includes an HR mirror 621, flat mirrors 622, a scraper mirror 623, and a feedback mirror 624. System 700 includes an HR mirror 704, a flat mirror 710, a scraper mirror 730, and a feedback mirror 740.

Figure 8:
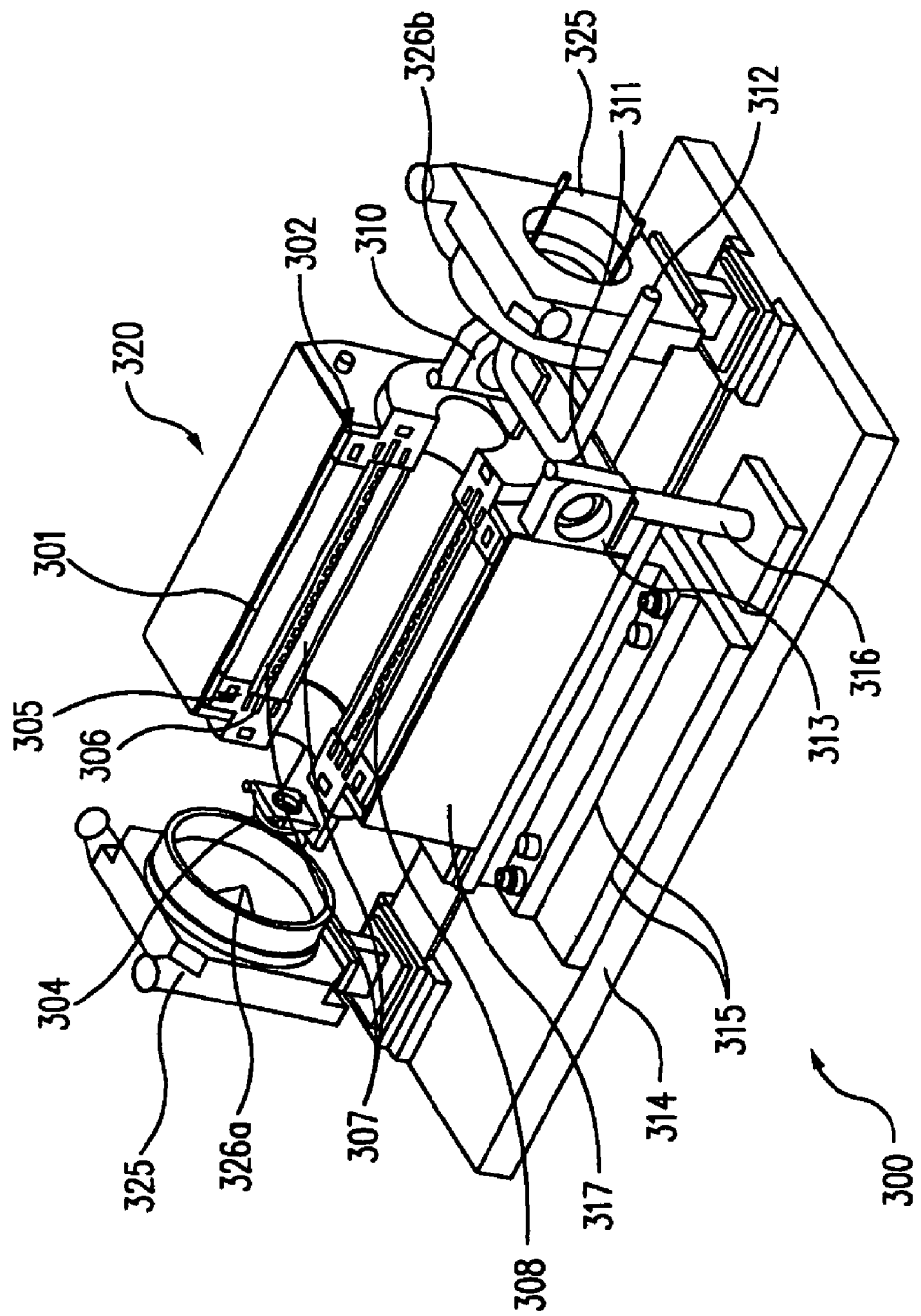
FIG. 8 shows a laser amplifier module assembly in accordance with another embodiment of the present invention.
Figure 9:
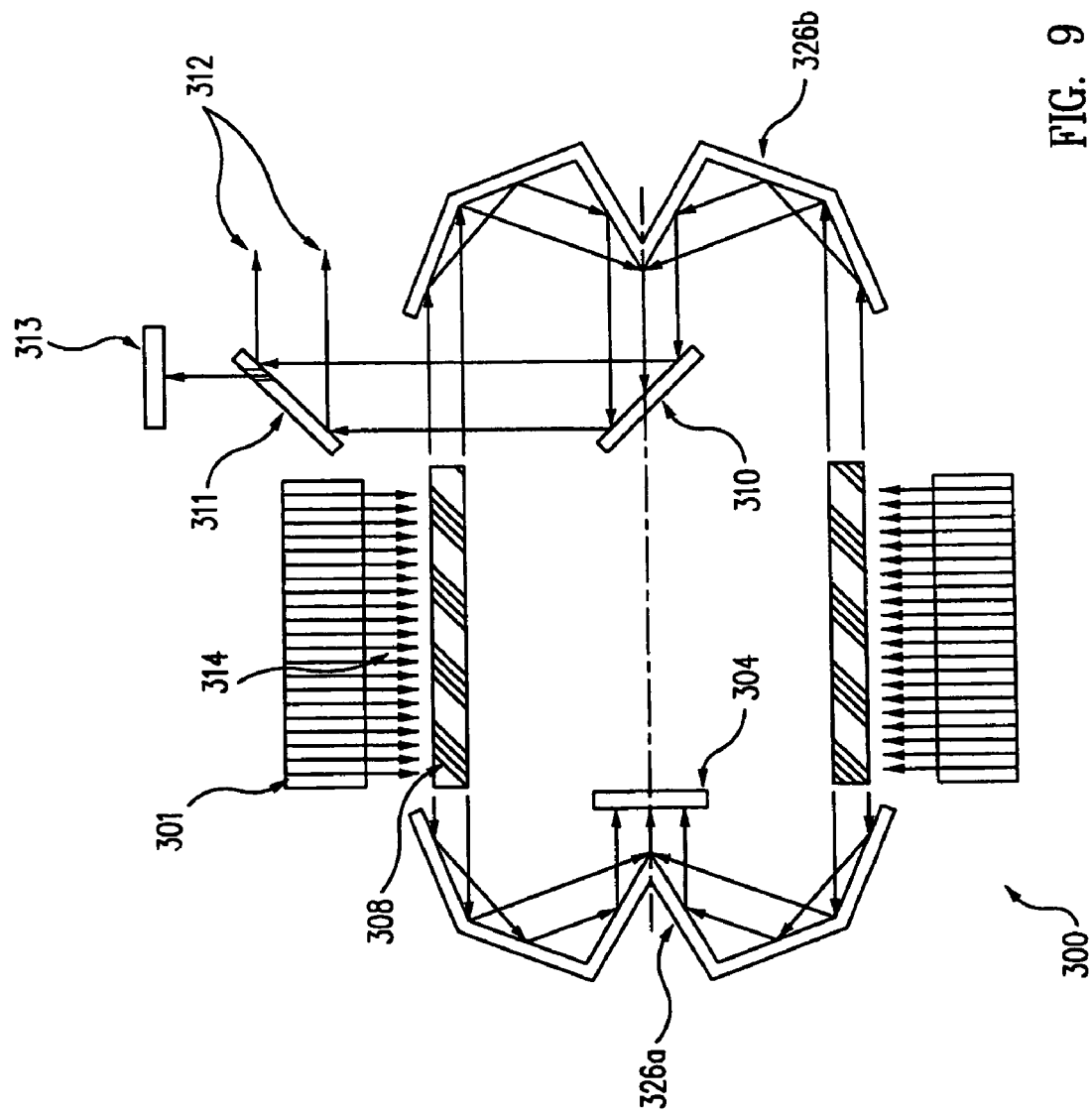
FIG. 9 shows an optical layout for the laser amplifier module assembly illustrated in FIG. 8 in accordance with an embodiment of the present invention.

Referring now to FIGS. 8 and 9, a laser amplifier system 300 including a laser amplifier module 320, and an optical layout therefor, are shown in accordance with another embodiment of the present invention. Amplifier module 320 comprises a stack of diode arrays 301, two identically loaded tube laser gain elements 308a (similar to gain elements 108a of FIG. 2A) separated by an optically transparent 90 degree quartz rotator, with two undoped endcaps 306 (similar to endcaps 106 of FIG. 2A) on both ends of laser tube 308. Module 320 further includes flow passages and a plurality of microchannels within optically transparent substrates 307, and manifolds 302 and 305, for flowing a coolant. System 300 further includes an HR flat mirror 304, two waxicon mirrors 326a and 326b with waxicon mirror mount 325, a flat mirror 310, an OC flat mirror or scraper mirror with decentered hole 311, an HR feedback mirror 313, an optical post 316, adjustment plates 315, an optical bench 314, and a housing 317.

The stack of diode arrays 301 provide optical radiation 314 to two laser gain elements 308a of a tube 308. The laser gain medium is doped with suitable laser ions that absorb significant portions of incident optical radiation 314 and are pumped to upper laser transition. Accordingly, the tube laser gain elements amplify resonator laser beam and out beam 312. After the annular beam is converted by waxicon mirror 326b to a cylindrical beam, the beam reflects from flat mirror 310 to OC mirror or scraper mirror with decentered hole 311. Through this hole, the laser beam is incident upon HR feedback mirror 313. Using an OC or scraper mirror, which has an offset aperture for passage of the return beam, permits the optical axis of the resonator to no longer be centered on the apex of waxicon mirror 326b, and the apex can be truncated without significant loss of mode control.

The return beam reflects from HR feed back mirror 313 and flat mirror 310 to waxicon mirror 326b. After the cylindrical beam is converted by waxicon mirror 326b to an annular beam, the beam goes through laser gain elements 308a and reflect from waxicon mirror 326a (which converts annular beam to cylindrical beam) to HR flat mirror 304.

It is noted that various optical elements may be used in the present invention, examples of which are described in commonly-assigned U.S. Pat. Nos. 4,514,850, 4,516,244, and 4,598,408, which are incorporated by reference herein for all purposes.

Embodiments described above illustrate but do not limit the invention. It should also be understood that numerous modifications and variations are possible in accordance with the principles of the present invention. Accordingly, the scope of the invention is defined only by the following claims.

I claim:

1. An amplifier module for a solid-state laser, the amplifier module comprising:
   a tube having an interior surface and an exterior surface, the tube including two laser gain elements separated by a toric quartz rotator which is attached between two optically transparent endcaps attached to respective ends of the two laser gain elements;
   a first substrate adjacent the interior surface of the tube, the first substrate including a first plurality of microchannels;
   a second substrate adjacent the exterior surface of the tube, the second substrate including a second plurality of microchannels; and
   a plurality of diode bars arranged exterior to the second substrate and configured to provide optical pump radiation to the laser gain elements.

2. The amplifier module of claim 1, wherein the two laser gain elements are identically loaded and separated by a 90 degree toric quartz rotator.

3. The amplifier module of claim 1, wherein the first and second substrates are optically transparent.

4. The amplifier module of claim 1, wherein the interior and outer surfaces of the tube include a taper.

5. The amplifier module of claim 1, wherein the first and second plurality of microchannels are adjacent the tube.

6. The amplifier module of claim 1, wherein the first and second plurality of microchannels are provided substantially parallel to a lengthwise axis of the tube or substantially perpendicular to a lengthwise axis of the tube.

7. The amplifier module of claim 1, further comprising optics operably coupled to at least one end of the tube, the optics being selected from the group consisting of axicon, waxicon, and reflaxicon optics.

8. The amplifier module of claim 1, wherein the plurality of diode bars may be rotated relative to the tube.

9. The amplifier module of claim 1, further comprising undoped endcaps operably coupled to an end of the tube.

10. The amplifier module of claim 1, further comprising a housing for housing the tube, the first substrate, the second substrate, and the plurality of diode bars, the housing including coolant manifolds for circulating coolant through the first and second plurality of microchannels.

11. A method of lasing, comprising:
   providing an amplifier module including:
      a tube having an interior surface and an exterior surface, the tube including two laser gain elements separated by a toric quartz rotator which is attached between two optically transparent endcaps attached to respective ends of the two laser gain elements;
      a first substrate adjacent the interior surface of the tube, the first substrate including a first plurality of microchannels;
      a second substrate adjacent the exterior surface of the tube, the second substrate including a second plurality of microchannels; and
      a plurality of diode bars arranged exterior to the second substrate; providing pump radiation from the plurality of diode bars to the laser gain elements of the amplifier module; and
   flowing a coolant through the first and second plurality of microchannels.

12. The method of claim 11, wherein the flowing of the coolant through the first and second plurality of microchannels is independently controlled.

13. The method of claim 11, further comprising:
   operably coupling optics to at least one end of the amplifier module, the optics being selected from the group consisting of axicon, waxicon, and reflaxicon optics; and
   operably coupling a plurality of amplifier modules to one another for amplification of a laser beam.

14. The method of claim 11, further comprising rotating the plurality of diode bars relative to the tube.

* * * * *